(No Model.)

F. RHIND.
ORNAMENTATION OF GLASSWARE.

No. 258,808. Patented May 30, 1882.

Witnesses:
Nm. W. Mortimer.
Will H. Kern

Inventor:
Frank Rhind,
per
F. W. Lehmann,
Atty.

United States Patent Office.

FRANK RHIND, OF BROOKLYN, NEW YORK.

ORNAMENTATION OF GLASSWARE.

SPECIFICATION forming part of Letters Patent No. 258,808, dated May 30, 1882.

Application filed January 30, 1882. (No model.)

*To all whom it may concern:*

Be it known that I, FRANK RHIND, of Brooklyn, in the county of Kings and State of New York, have invented certain new and useful Improvements in Ornamentation of Glassware; and I do hereby declare the following to be a full, clear, and exact description of the invention, such as will enable others skilled in the art to which it pertains to make and use it, reference being had to the accompanying drawings, which form part of this specification.

My invention relates to an improvement in the ornamentation of glassware; and it consists in securing to the inner side of the article that is to be decorated a suitable picture or ornament of pearl, then coating the inner side of the article with a gum, and then covering the gum with smalts, brocade, or mica-dust of any suitable color or mixture of colors, as will be more fully described hereinafter.

The object of my invention is to ornament glass so as to give it the appearance of polished granite of any color or a brilliant color of any hue that may be preferred.

Figure 1:
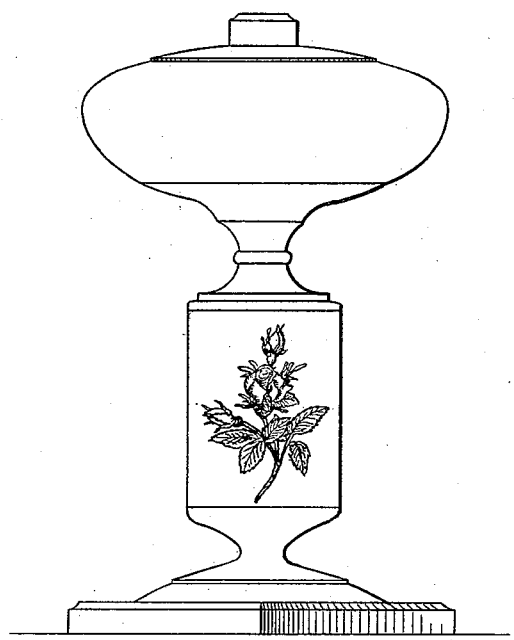
Figure 2:
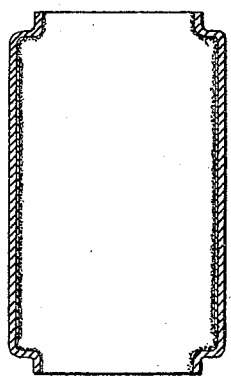

In the accompanying drawings, Figure 1 is a side elevation of a lamp decorated by my process. Fig. 2 is a vertical section of the ornamented part.

I take a glass article of any desired shape or size, and to its inner side attach a picture or ornament of pearl of any kind. The surface to which the ornament is attached is then covered by a colorless, or nearly colorless, gum, and this gum surface is then covered with smalts, brocade, or mica-dust of any desired color or any combination of colors, so as to give a mottled or other desired appearance. The smalts used may consist of colored sand, broken-up glass, or other solid matter in small pieces, and either a single kind of any one article may be used or a number of them may be mixed together. The smalts, showing through the glass and gum, give the glass the appearance of polished marble.

This method of ornamenting glass is particularly adapted to glass cylinders of all kinds, whether used for ornamenting lamps or for any other purpose.

Having thus described my invention, I claim—

As a new article of manufacture, a glass cylinder for lamp-pedestals, having its inner surface coated with gum and a covering of any suitable colored granular substance applied to the gum while wet, as set forth.

In testimony whereof I affix my signature in presence of two witnesses.

FRANK RHIND.

Witnesses:
 WM. APGAR,
 FRANK W. LEWIS.